US012662652B2

(12) United States Patent
Job et al.

(10) Patent No.: US 12,662,652 B2
(45) Date of Patent: Jun. 23, 2026

(54) WASHING AGENT PORTION UNIT

(71) Applicant: Henkel AG & Co. KGaA, Duesseldorf (DE)

(72) Inventors: Mareile Job, Leverkusen (DE); Frank Meier, Duesseldorf (DE); Matthias Sunder, Duesseldorf (DE); David Matulla, Hilden (DE); Rainer Sorg, Kempen (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 404 days.

(21) Appl. No.: 18/299,219

(22) Filed: Apr. 12, 2023

(65) Prior Publication Data

US 2023/0242849 A1 Aug. 3, 2023

Related U.S. Application Data

(63) Continuation of application No. PCT/EP2021/073833, filed on Aug. 30, 2021.

(30) Foreign Application Priority Data

Oct. 16, 2020 (DE) ......................... 102020213066.3
Oct. 16, 2020 (DE) ......................... 102020213067.1
Oct. 16, 2020 (DE) ......................... 102020213069.8
Oct. 16, 2020 (DE) ......................... 102020213070.1

(51) Int. Cl.

| | |
|---|---|
| ***C11D 3/00*** | (2006.01) |
| ***C11D 3/395*** | (2006.01) |
| ***C11D 3/50*** | (2006.01) |
| ***C11D 17/04*** | (2006.01) |

(52) U.S. Cl.

CPC .......... *C11D 17/044* (2013.01); *C11D 3/3951* (2013.01); *C11D 3/3953* (2013.01); *C11D 3/3955* (2013.01); *C11D 3/505* (2013.01); *C11D 2111/12* (2024.01)

(58) Field of Classification Search

None

See application file for complete search history.

(56) References Cited

U.S. PATENT DOCUMENTS

| | | | |
|---|---|---|---|
| 7,507,699 | B2 | 3/2009 | Burt et al. |
| 10,494,767 | B2 | 12/2019 | Weisman et al. |

FOREIGN PATENT DOCUMENTS

| | | | | |
|---|---|---|---|---|
| DE | 60301823 | T2 * | 5/2006 | ........... C11D 17/044 |
| JP | H05321105 | A | 12/1993 | |
| JP | H108098 | A | 1/1998 | |
| JP | 2021509137 | A * | 3/2021 | ............ C11D 17/06 |
| WO | 03044152 | A1 | 5/2003 | |

OTHER PUBLICATIONS

The Cosmetic, Toiletry, and Fragrance Association, CTFA International Cosmetic Ingredient Dictionary, Fourth Edition, Edited by Joanne M. Nikitakis et al., 1991, 23 pages, The Cosmetic, Toiletry, and Fragrance Association, Washington D.C.

German Patent and Trademark Office, Research Report, DE 10 2020 213 067.1, Jun. 11, 2021, pp. 1-6, Munich, Germany.

European Patent Office, PCT International Search Report, PCT/EP2021/073833, Dec. 7, 2021, pp. 1-16, Rijswijk, Netherlands.

* cited by examiner

*Primary Examiner* — Necholus Ogden, Jr.

(74) *Attorney, Agent, or Firm* — Blank Rome LLP

(57) ABSTRACT

A washing agent portion unit includes a solid washing agent or cleaning agent, and a water-soluble wrapping that completely encloses the solid washing agent or cleaning agent, wherein the water-soluble wrapping consists at least in part of a water-soluble nonwoven. The present invention further relates to a method for producing said washing agent portion unit, and to a washing method using said washing agent portion unit.

20 Claims, No Drawings

WASHING AGENT PORTION UNIT

FIELD OF THE INVENTION

The present invention relates to a washing agent portion unit comprising at least one receiving chamber filled with a solid washing agent or cleaning agent, which receiving chamber is formed by a water-soluble wrapping that comprises a water-soluble nonwoven. Furthermore, the application relates to a method for producing said washing agent portion unit and a washing method for textiles using such a washing agent portion unit.

BACKGROUND OF THE INVENTION

Continuously changing requirements are imposed on the forms of manufacture and supply of washing agents and cleaning agents. In this case, a main focus has, for quite some time, been on the convenient metering of washing agents and cleaning agents by the consumer and the simplification of the work steps necessary for carrying out a washing or cleaning method. A technical solution is provided by pre-portioned washing agents or cleaning agents—for example, water-soluble containers having one or more receiving chambers for solid or liquid washing agents or cleaning agents.

To produce the water-soluble containers, water-soluble polymers are generally deformed to form receiving chambers, which are subsequently filled with a washing agent or cleaning agent and finally closed. The receiving chambers can be produced, for example, from water-soluble polymer films (foils) by means of deep-drawing methods. In an alternative embodiment of the method, a water-soluble polymer is deformed by means of injection molding to form a receptacle.

Solid and liquid washing agents or cleaning agents are suitable for filling the water-soluble containers. If solid washing agents or cleaning agents are used and contain gas-releasing constituents, such as bleaching agents, the closed water-soluble container has perforations to avoid excessive pressure formation, which allow gas exchange between the interior of the receiving chamber and the environment. The design of corresponding perforations requires an additional method step in the production of the water-soluble packaging means or during the production of the filled washing agent metering units.

The filled washing agent portion units are generally hygroscopic due to the water-soluble packaging material used for their production. In the context of the production, packaging, storage, and subsequent use by the consumer, the water absorption tendency and water absorption capacity of the packaging means can cause the portion units to adhere to surfaces of machines or packaging means and not be able to be conveyed optimally, or adjacent portion units, e.g., in a common outer packaging, to adhere to one another. To avoid this adhesion tendency of the water-soluble portion units, it is possible to modify the surface properties thereof by applying a powder agent. The powdering of the water-soluble washing agent portion units in turn requires an additional method step.

Finally, the chemical nature of conventional water-soluble packaging means, e.g., polymer films, in combination with their latent hygroscopicity, results in a specific product feel that can be perceived as sticky and detracts from the product experience.

Due to portioning in a water-soluble packaging material, the fragrances added to the washing agent or cleaning agent are used only to a very limited extent or not at all in washing agent portion units, unlike in conventional solid washing agent powders. In response to this situation, washing agent products are marketed whose outer cardboard packaging is provided, for example, with fragrance-containing adhesive agents and conveys to the consumer an impression of the fragrance of the washing agent or cleaning agent contained therein.

Finally, the washing performance provided by the washing agent portion unit is directly related to the dissolution properties of the portion unit. Particularly with regard to the increasing use of cold washing methods, it is preferred to keep the thickness of the water-soluble film material contained in the washing agent portion unit as low as possible in order to accelerate the dissolution process. However, the reduction in the thickness of the surrounding film material simultaneously requires a reduced mechanical stability of the portion units. Overcoming this apparent dichotomy of mechanical stability and dissolution rate of washing agent portion units packaged using water-soluble films is still a relevant aspect in the development of water-soluble washing agent portion units.

BRIEF DESCRIPTION OF THE INVENTION

Against the background of the prior art described above, it is the object of the application to provide water-soluble washing agent portion units that can be produced by means of simplified methods, have high product and storage stability, can be prepared in a simple manner using minimal amounts of additional packaging material, such as stand-up pouches or cardboard, and excite the consumer with an attractive olfactory, visual, and tactile experience.

DETAILED DESCRIPTION OF THE INVENTION

A washing agent portion unit, comprising the following, is suitable for achieving these objects:

a) a solid washing agent or cleaning agent and b) a water-soluble wrapping that completely encloses the solid washing agent or cleaning agent, wherein the water-soluble wrapping consists at least in part of a water-soluble nonwoven.

The term “washing agent portion unit” describes a supply form in which a measured portion of a washing agent or cleaning agent is present. Washing agent portion units consequently refer both to supply forms for textiles and to supply forms for cleaning hard surfaces such as ceramics, glass, metal, or tiles.

The washing agent portion unit is preferably in the form of a bag. The volume thereof is preferably 4 to 70 mL, preferably 6 to 50 mL, and in particular 8 to 25 mL.

The bags can be in the form of sachets (sealed-edge bags) or tubular bag packaging. In the case of packaging as a sachet, said sachet preferably has two water-soluble two-dimensional structures that are connected to a bag by means of a circumferential sealing seam, the interior of which bag contains the solid washing agent or cleaning agent. The two water-soluble two-dimensional structures preferably have an identical shape. This shape can be of geometric basic shapes, such as circles, ovals, triangles, squares, rectangles, pentagons, hexagons, heptagons, octagons, or other polygons. Alternatively, this shape can be designed in the form of a figure—for example, as an organic shape from the plant or animal world. Preferably, at least one of the two water-soluble two-dimensional structures of the sachet comprises a water-soluble nonwoven. The sealing seams of preferred sachets exclusively have rounded profiles. Surprisingly, it has been shown that, during storage and transport, the solid washing agent or cleaning agent accumulates in the corners of non-rounded sealing seam profiles, thereby weakening the wrapping material and/or the seam in this region, and thus reducing the storage and transport stability of the sachets.

In an alternative embodiment, the washing agent portions have a formed receiving chamber (deep-drawing bag). The receiving chambers can have any technically feasible shape. Spherical dome-shaped, cylindrical, or cubical chambers are particularly preferred. Preferred receiving chambers have at least one edge and one corner; receiving chambers having two, three, four, five, six, seven, eight, nine, ten, eleven, twelve, thirteen, fourteen, fifteen, sixteen, seventeen, eighteen, nineteen, twenty or more edges or two, three, four, five, six, seven, eight, nine, ten, eleven, twelve, thirteen, fourteen, fifteen, sixteen, seventeen, eighteen, nineteen, twenty or more corners are also realizable and preferred according to the invention. Further receiving chambers that can be realized and are preferred in alternative embodiments of the means according to the invention have a dome-shaped structure. The side walls of the receiving chambers are preferably planar. Spatially opposite side walls can be arranged to be both parallel and non-parallel to one another. The base surface of the receiving chambers can be convex, concave, or planar, wherein, in view of the later filling of the intermediate space(s) located between the receiving chambers, planar base surfaces are preferred. The base surface itself can be configured as a circle, but can also have corners. Base surfaces having one corner (drop shape), two, three, four, five, six, seven, eight, nine, ten, eleven, twelve, thirteen, fourteen, fifteen, sixteen, seventeen, eighteen, nineteen, twenty or more corners are preferred in the context of the present application. The transition of the base surface to the side walls or the transition of the side walls into one another is configured in a rounded shape in preferred embodiments of this application. The receiving chambers accordingly have no pointed or sharp edges, but, rather, rounded edges.

In a preferred embodiment of the washing agent portion unit, the water-soluble nonwoven forms part of the outer surface of the washing agent portion unit and is in direct contact with the solid washing agent or cleaning agent.

The washing agent portion unit comprises a solid washing agent or cleaning agent as a first substantial component. In the context of the present application, powders and/or granule materials and/or extrudates and/or compactates and/or cast bodies are preferably considered to be solids, irrespective of whether they are pure substances or substance mixtures. Suitable solid washing agents or cleaning agents are granule materials, extrudates, and compaction. The solids mentioned can be present in an amorphous and/or crystalline and/or partially crystalline form. In the context of the present invention, preferred solids have a water content (for example, determinable as a loss upon drying or according to Karl Fischer) of below 10 wt. %, and preferably below 5 wt. %.

Powder is a general designation for a form of division of solid substances and/or substance mixtures that is obtained by means of comminution, i.e., triturating or grinding in a mortar (pulverizing), grinding in mills, or as a result of atomization or freeze drying.

Particularly fine division is often referred to as atomization or micronization; the corresponding powders are referred to as micropowders. Preferred powders have a uniform (homogeneous) mixture of the solid, finely-divided constituents and, in the case of substance mixtures, tend not to separate into individual constituents of these mixtures. Powders particularly preferred in the context of the present application therefore have a particle size distribution in which at least 80 wt. %, preferably at least 60 wt. %, particularly preferably at least 95 wt. %, and in particular at least 99 wt. % of the powder, in each case relative to the total weight thereof, deviates from the mean particle size of said powder to a maximum extent of 80%, preferably to a maximum extent of 60%, and in particular to a maximum extent of 40%.

According to the grain size, a rough division of the powders into coarse, fine, and ultrafine powders is customary; pulverulent bulk materials are classified more precisely by their bulk density and by sieve analysis. In principle, powders of any particle size can be used, but preferred powders have average particle sizes of 40 to 500 μm, preferably 60 to 400 μm, and in particular 100 to 300 μm. Methods for determining the average particle size are usually based upon the aforementioned sieve analysis and are described in detail in the prior art.

The undesired caking of the powders can be countered using flow aids or powdering agents. In a preferred embodiment, the powders produced in the method according to the invention therefore contain flow aids or powdering agents, preferably in weight fractions of 0.1 to 4 wt. %, particularly preferably 0.2 to 3 wt. %, and in particular 0.3 to 2 wt. %, in each case relative to the total weight of the powder. Preferred flow aids or powdering agents are—preferably in a finely-ground form—silicates and/or silicon oxide and/or urea.

As particulate mixtures, powders can be agglomerated using a range of techniques. Each method known in the prior art for agglomerating particulate mixtures is suitable in principle for converting the solids enclosed in the containers produced according to the invention into larger aggregates. In the context of the present invention, agglomerates used as solid(s) are—in addition to granule materials—compaction and extrudates.

Granule materials refer to accumulations of granule particles. A granule particle (granule) is an asymmetrical aggregate of powder particles. Granulation methods are widely described in the prior art. Granule materials can be produced by means of moist granulation, dry granulation, or compaction, and by means of melt-solidification granulation.

The most commonly used granulation technique is moist granulation because this technique is subject to the fewest restrictions and leads most reliably to granules having favorable properties. Moist granulation is effected by moistening the powder mixtures with solvents and/or solvent mixtures and/solutions of binders and/or solutions of adhesives, and is preferably carried out in mixers, fluidized beds, or spray towers, wherein said mixers may be equipped, for example, with stirring and kneading tools. The granulation agents used can also be foams. However, it is also possible to use combinations of fluidized bed(s) and mixer(s), or combinations of different mixers, for the granulation. Depending upon the starting material and upon the desired product properties, the granulation is effected under the action of low to high shear forces.

When the granulation is effected in a spray tower, the starting substances used may, for example, be melts (melt-solidification) or—preferably aqueous—slurries (spray-drying) of solid substances that are sprayed in defined droplet size at the top of a tower, solidify, or dry in free fall, and occur as a granule at the bottom of the tower. The melt-solidification is generally suitable particularly for shaping low-melting substances that are stable in the region of the melt temperature (for example, urea, ammonium nitrate, and various formulations such as enzyme concentrates, medicaments, etc.); the corresponding granules are also referred to as prills. Spray-drying is used particularly for the production of washing agents or washing agent constituents.

Further agglomeration techniques are those of extruder or perforated roll granulation, in which, optionally, powder mixtures admixed with granulating liquid are plastically deformed during pressing by perforated disks (extrusion) or on perforated rolls. The products of extruder granulation are also referred to as extrudates.

Compaction can be done, for example, by means of dry granulation techniques such as tableting or roll compaction. Compaction in tablet presses allows single- or multiphase tablets or briquettes to be produced. The multiphase tablets include not only the multilayer or sandwich tablets, but also, for example, the coated tablets and the inlay tablets (bull's-eye tablets). Just like the flakes obtained in compacting rolls, the briquettes may subsequently be comminuted after the compaction by counter-running toothed rolls, or be passed through sieves.

In the context of the present application, castings refer to solid substance particles that are produced by solidification and/or crystallization from melts or solutions. The solidification and/or crystallization is effected preferably in prefabricated dies. The castings removed from the dies after solidification may subsequently, depending upon the size of the die and intended use of the casting, be used in their original size or, optionally, after comminution, as solids.

The solid washing agent or cleaning agent is preferably at least in part colored. A colored washing agent or cleaning agent allows an attractive visual configuration of the washing agent portion unit—in particular, in combination with a transparent wrapping. Furthermore, the use of colored components in the solid washing agent or cleaning agent allows—in particular, in combination with a transparent and/or white wrapping—simplified detection of insufficiently closed, washing agent portion units in the region of the maturation and packaging downstream of the actual production.

A second essential component of the washing agent portion unit is the water-soluble wrapping. In the preferred washing agent portion unit, the water-soluble wrapping consists of a water-soluble polymer to an extent of at least 50 wt. %, preferably to an extent of at least 60 wt. %, particularly preferably to an extent of 60 to 95 wt. %, and in particular to an extent of 65 to 95 wt. %. A preferred water-soluble polymer is selected from the group of polyvinyl alcohols and copolymers thereof, and preferably from the group of polyvinyl alcohols.

In a first embodiment, the water-soluble wrapping of the washing agent portion unit consists entirely of a water-soluble nonwoven. This embodiment is aesthetically very attractive and technically advantageous, but at the same time associated with increased costs.

In a technically and economically, particularly advantageous, preferred embodiment, the washing agent portion unit has a water-soluble wrapping that comprises a water-soluble polymer film and a water-soluble nonwoven. It is preferred if the water-soluble nonwoven forms at least 10%, preferably 15 to 80%, particularly preferably 25 to 60%, and in particular 30 to 45%, of the surface of the washing agent portion unit.

As stated at the outset, the washing agent portion is preferably packaged in the form of a bag (sealed-edge bag or deep-drawing bag). These and other packaging forms can be realized, for example, by a water-soluble wrapping that comprises a water-soluble polymer film and a water-soluble nonwoven, wherein the edge regions of the water-soluble polymer film and of the water-soluble nonwoven are connected to one another such that both jointly enclose a volume that is filled at least in part with the solid washing agent or cleaning agent.

In order to ensure effective use of the wrapping material used, in preferred washing agent portion units the volume enclosed by the water-soluble wrapping corresponds to more than twice the volume, preferably more than four times the volume and in particular more than eight times the volume of the water-soluble wrapping material.

For the same reason, in preferred washing agent portion units, the proportion by weight of the water-soluble wrapping with respect to the total weight of the washing agent portion unit is less than 20 wt. %, preferably less than 10 wt. %, and in particular less than 8 wt. %, particularly preferably between 2 and 10 wt. % and very particularly preferably between 2 and 8 wt. %.

Due to the stability of the sealing seams thus obtained, it is preferable for the water-soluble polymer film and the water-soluble nonwoven of the water-soluble wrapping of the washing agent portion unit to be bonded to one another by heat sealing, water sealing, ultrasound welding.

In a particularly preferred alternative embodiment, the water-soluble polymer film and the water-soluble nonwoven of the water-soluble wrapping of the washing agent portion unit are sewn together. The resulting seam is not only visually attractive, but the sewing of the components of the water-soluble wrapping also prevents the formation of a poorly soluble sealing region, which arises when two films or nonwovens or one film and one nonwoven are welded or glued to one another. For this reason, the design of such a seam increases the rate of disintegration of the washing agent portion unit and ensures residue-free dissolution even at low washing temperatures.

For the dissolution properties of the washing agent portion unit, it has proven to be particularly advantageous if the water-soluble polymer film and the water-soluble nonwoven are sewn together by means of a water-soluble material, preferably by means of a water-soluble thread, particularly preferably by means of a water-soluble thread made of polyvinyl alcohol.

As described above, a group of preferred washing agent portion units has at least one receiving chamber. Corresponding receiving chambers can be produced, for example, by means of a deep-drawing method, in the course of which a film is drawn into a cavity by the action of negative pressure and formed into a receiving chamber. This receiving chamber can subsequently be filled and, for example, closed with a water-soluble nonwoven. The resulting washing agent portion units, the water-soluble wrapping of which comprises a deep-drawn water-soluble polymer film and a water-soluble nonwoven, are preferred due to their optical and haptic attractiveness, high mechanical stability and easy accessibility.

Water-soluble polymer films for producing the water-soluble wrapping are preferably based on a polyvinyl alcohol or a polyvinyl alcohol copolymer. The molecular weight of the polyvinyl alcohol or a polyvinyl alcohol copolymer is preferably in the range from 10,000 to 1,000,000 $gmol^{-1}$, preferably from 20,000 to 500,000 $gmol^{-1}$, particularly preferably from 30,000 to 100,000 $gmol^{-1}$, and in particular from 40,000 to 80,000 $gmol^{-1}$.

The production of the polyvinyl alcohol and polyvinyl alcohol copolymers generally includes the hydrolysis of intermediate polyvinyl acetate. Preferred polyvinyl alcohols and polyvinyl alcohol copolymers have a degree of hydrolysis 70 to 100 mol. %, preferably 80 to 90 mol. %, particularly preferably 81 to 89 mol. %, and in particular 82 to 88 mol. %.

Preferred polyvinyl alcohol copolymers include, in addition to vinyl alcohol, an ethylenically unsaturated carboxylic acid, or the salt or ester thereof. In addition to vinyl alcohol, such polyvinyl alcohol copolymers particularly preferably contain sulfonic acids, such as 2-acrylamido-2-methyl-1-propanesulfonic acid (AMPS), acrylic acid, methacrylic acid, acrylic esters, methacrylic esters or mixtures thereof; among the esters, preference is given to $C_{1-4}$ alkyl ester or hydroxyalkyl esters. Ethylenically unsaturated dicarboxylic acids, for example itaconic acid, maleic acid, fumaric acid and mixtures thereof, are possible as further monomers.

Suitable water-soluble films are marketed, for example, by the company MonoSol LLC, for example under the name M8630, M8720, M8310, C8400 or M8900. Other suitable films include films with the name Solublon® PT, Solublon® GA, Solublon® KC or Solublon® KL by Aicello Chemical Europe GmbH or the VF-HP films by Kuraray.

The water-soluble films can contain additional active ingredients or fillers, but also plasticizers and/or solvents, in particular water, as further ingredients.

In this case, the group of the further active ingredients includes, for example, materials that protect the ingredients of the preparation (A) that are enclosed by the film material from decomposition or deactivation by light irradiation. Antioxidants, UV absorbers and fluorescent dyes have proven to be particularly suitable here.

As plasticizers, it is possible to use, for example, glycerol, ethylene glycol, diethylene glycol, propanediol, 2-methyl-1,3-propanediol, sorbitol or mixtures thereof.

To reduce the coefficients of friction thereof, the surface of the water-soluble film can optionally be powder-coated with fine powder. Sodium aluminosilicate, silicon dioxide, talc and amylose are examples of suitable powdering agents. Surprisingly, it has been found that the washing agent portion units have a significantly reduced coefficient of friction and a significantly reduced tendency to bond due to the nonwoven used in the region of the wrapping, which is why the use of powder means in the production and storage of these washing agent portion units can be reduced or even completely dispensed with.

Like the water-soluble polymer films, the water-soluble nonwovens are also preferably based upon a water-soluble polymer and, due to their availability, in particular upon polyvinyl alcohol and polyvinyl alcohol copolymers, and particularly preferably upon polyvinyl alcohols. The washing agent portion unit according to one of the preceding points, wherein the water-soluble nonwoven consists of polyvinyl alcohol or polyvinyl alcohol copolymers, and in particular polyvinyl alcohols, to an extent of at least 50 wt. %, preferably to an extent of at least 70 wt. %, particularly preferably to an extent of at least 90 wt. %, and in particular to an extent of at least 98 wt. %.

In addition to the preferably polymeric, water-soluble basic structure, the nonwovens may comprise further ingredients. These include, for example, plasticizers, process aids, or washing and cleaning ingredients. If washing or cleaning ingredients are added, these can be incorporated between the fibers of the nonwoven, where they are fixed, for example, by means of adhesive bonding. However, the washing or cleaning ingredients are preferably an integral component of the fibers of the nonwoven and are embedded in the preferably polymeric, water-soluble matrix of the fibers. In a preferred embodiment, the water-soluble nonwoven contains more than 2 wt. %, preferably more than 4 wt. %, particularly preferably more than 8 wt. %, in particular 8 to 60 wt. %, preferably 12 to 50 wt. %, and in particular 24 to 40 wt. % washing or cleaning ingredient.

Washing and cleaning ingredients from the group of surfactants, polymers, and fragrances are particularly suitable for incorporation into the nonwoven. The incorporation of fragrances has an effect that is directly perceptible to the consumer, which is why washing agent portion units are preferred in which the water-soluble nonwoven comprises at least one washing or cleaning ingredient from the group of fragrances.

Nonwoven materials are structures made of fibers that are joined together to form a fiber layer. The term "nonwoven" has become an established term for this in the English language. Nonwovens are preferably flexible and bendable. Films or papers are not counted among nonwovens.

Preferred nonwovens are based upon water-soluble polymer fibers, and in particular upon water-soluble fibers based upon polyvinyl alcohol and polyvinyl alcohol copolymers.

The fiber length of the water-soluble polymer fibers is preferably in the range of 1 to 40 mm, and particularly preferably of 2 to 20 mm. The thickness of the fibers is preferably 0.1 to 1000 μm, and preferably 0.5 to 400 μm. The density of the nonwoven is preferably over 0.15 $g/cm^3$, preferably over 0.2 $g/cm^3$, and in particular in the range of 0.2 to 0.8 $g/cm^3$.

The nonwovens can be produced, for example, by means of mechanical, aerodynamic, or hydrodynamic methods of the prior art. The fibers of the nonwoven can be mechanically solidified, e.g., by means of frictional engagement or a form fit; chemically, e.g., by using binding or solvents; or thermally, by using thermoplastic additives.

In a preferred variant of the washing agent portion units, the water-soluble nonwovens are needle-punched nonwovens. In corresponding nonwovens, the entanglement, and thus the compaction and solidification of the fibers by means of needling, e.g., by means of suitable needle boards or needle bars, is achieved.

Preferred in particular are nonwovens, and preferably needle-punched nonwovens, from the group of random orientation nonwovens. In these nonwovens, the fibers have any desired direction and are distributed relatively uniformly in all directions of the nonwoven. Corresponding nonwovens are distinguished not only by a particular appearance and feel, but also improve the mechanical stability of the solid washing agents or cleaning agents comprised by the washing agent portion unit during transport and storage due to the compressibility thereof—for example, in the case of mechanical vibration of a container containing said washing agent portion unit.

With regard to the appearance, feel, and mechanical properties of the washing agent portion unit, it has proven advantageous for the water-soluble nonwoven, and in particular the layer of nonwoven, to have a weight per unit area of 40 to 200 $g/m^2$, preferably of 60 to 180 $g/m^2$, and in particular of 80 to 160 $g/m^2$.

In a further preferred variant of the washing agent portion unit, the water-soluble nonwovens are integral nonwovens. In these nonwovens, the fibers are connected by means of an integral connection by means of additives. These binders allow the adhesive connection of the fibers to one another.

Due to their properties, water-soluble nonwovens from the group of the cross-layered nonwovens are particularly preferred, in addition to the random orientation nonwovens. Said nonwovens are produced, for example, by depositing the fibers on a deposit belt with a longitudinal orientation of the fibers relative to the overall nonwoven, wherein the fibers are preferably oriented in two directions. Cross-layered nonwovens also differ visually and haptically from the water-soluble films usually used for producing washing agent portion units, but are also better suited than the layer of nonwoven fabrics for printing.

With regard to the pressure-related properties of the washing agent portion unit, it has proven advantageous if the water-soluble nonwoven, and in particular the cross-layered nonwoven, has a weight per unit area of 30 to 80 g/m$^2$, preferably of 33 to 70 g/m$^2$, and in particular of 36 to 70 g/m$^2$.

In addition to the aforementioned washing or cleaning ingredients, the water-soluble nonwovens, and in particular the fibers of the water-soluble nonwovens, can contain further active substances relevant to the product action. The group of these active substances includes, for example, dyes. By adding dyes to the fibers of the water-soluble nonwovens, the optics of the washing agent portion unit can be changed. At the same time, directly or indirectly color-based product communication can be made possible by means of the coloring.

Directly color-based product communication is made possible, for example, by means of signal colors that indicate to the consumer a specific product effect. Such direct product communication is helpful, for example, in packs that comprise several washing agent portion units having different effects, e.g., washing agent portion units for textile cleaning, in combination with washing agent portion units for textile care, and each of these effects is assigned a specific color.

Indirectly color-based product combination describes, for example, product combination by means of an imprint on the water-soluble wrapping of the washing agent portion unit, which is particularly conspicuous or easily readable due to the color of the water-soluble wrapping surrounding the imprint. In this way, the variation of the basic color of the water-soluble wrapping allows an expansion of the selection of printing inks available for printing the water-soluble wrapping.

Due to their optical properties and their simpler production, preferred water-soluble nonwovens are white, i.e., not colored. The white color of the water-soluble nonwoven is particularly suitable for printing. A further feature of the nonwoven that is relevant for printing and its perception is, as already stated above, its special surface property, which differs from that of a conventional water-soluble film. Preferred washing agent portion units are consequently characterized in that the water-soluble nonwoven is printed on its outer side.

Particularly in combination with a white or a printed white nonwoven, the use of transparent water-soluble films as a constituent of the water-soluble wrapping has proven advantageous. Of course, it is also possible to print said water-soluble film.

The solid washing agents or cleaning agents described above in relation to their physical properties and the methods used for their production can, like the water-soluble nonwovens, contain washing or cleaning ingredients, wherein washing or cleaning ingredients from the group of builders, surfactants, washing polymers, enzymes, bleaching agents, and fragrances are particularly preferred.

A group of washing or cleaning ingredients, for which packaging by means of the washing agent portion units according to the invention offers particular advantages, are bleaching agents, and in particular oxygen bleaching agents. A corresponding washing agent portion unit in which the solid washing agent or cleaning agent comprises at least one washing or cleaning ingredient from the group of bleaching agents, and preferably oxygen bleaching agents, are therefore preferred.

Bleaching agents are in particular understood to mean compounds that supply hydrogen peroxide in an aqueous medium. Among the compounds used as bleaching agents that supply $H_2O_2$ in water, sodium percarbonate, sodium perborate tetrahydrate, and sodium perborate monohydrate are of particular importance. Further bleaches that can be used are, for example, peroxopyrophosphates, citrate perhydrates, and $H_2O_2$-supplying peracidic salts or peracids such as persulfates or persulfuric acid. Also useful is urea peroxohydrate percarbamide, which can be described by the formula $H_2N—CO—NH_2\ H_2O_2$. Particularly when the agents are used for cleaning hard surfaces, e.g., for automatic dishwashing, the washing agent portion units can, if desired, also contain bleaching agents from the group of organic bleaching agents, although their use is in principle also possible in agents for textile laundry. Typical organic bleaching agents are diacyl peroxides, such as, for example, dibenzoyl peroxide. Further typical organic bleaches are peroxy acids, wherein alkyl peroxy acids and arylperoxy acids are particularly mentioned as examples. Preferred representatives are (a) peroxybenzoic acid and ring-substituted derivatives thereof, such as alkyl peroxybenzoic acids, but also peroxy α-naphthoic acid and magnesium monoperphthalate, (b) aliphatic or substituted aliphatic peroxy acids, such as peroxylauric acid, peroxystearic acid, ε-phthalimidoperoxycaproic acid (phthalimidoperoxycaproic acid, PAP), o-carboxybenzamidoperoxycaproic acid, N-nonenylamidoperadipic acid, and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassilic acid, diperoxyphthalic acids, 2-decyl diperoxybutane-1,4-diacid, N,N-terephthaloyl-di-(6-aminopercaproic acid). The oxygen bleach is preferably selected from the group of sodium percarbonate and ε-phthalimidoperoxycaproic acid, particularly preferably from the group of sodium percarbonate. Preferred oxygen bleaching agents are formulated in particulate form, wherein the particles have a coating.

Bleaching agents, in particular oxygen bleaching agents, tend to decompose and release gas in storage despite customary stabilizing measures, such as using coatings, in particular during storage at increased temperatures or increased humidity. The release of gas from these bleaching agents is generally not compatible with the packaging in completely closed containers. For this reason, water-soluble containers for washing agents or cleaning agents of the prior art usually have perforations that allow gas to be exchanged between the interior of the container and the surrounding atmosphere. Such perforations can be dispensed with when using the washing agent portion units according to the invention due to the gas permeability of the water-soluble nonwoven used.

Preferred washing agent portion units are characterized in that the solid washing agent or cleaning agent comprises at least one washing or cleaning ingredient from the group of oxygen bleaching agents, wherein the weight fraction of the oxygen bleaching agent in the total weight of the solid washing agent or cleaning agent is 2 to 60 wt. %, and preferably 4 to 40 wt. %.

A second group of washing or cleaning ingredients, the packaging of which by means of the washing agent portion units according to the invention results in advantages, are fragrances. Preferred washing agent portion units are therefore characterized in that the solid washing agent or cleaning agent comprises at least one washing or cleaning ingredient from the group of fragrances. In preferred washing agent portion units, the proportion by weight of the fragrance with respect to the total weight of the solid washing agent or cleaning agent is 0.1 to 10 wt. %, preferably 0.2 to 6 wt. %.

A fragrance is a chemical substance that stimulates the sense of smell. In order to be able to stimulate the sense of smell, the chemical substance should be able to be distributed in the air, at least in part, i.e., the fragrance should be volatile at 25° C., at least to a small degree. If the fragrance is very volatile, the odor intensity then decreases rapidly again. In the case of a lower volatility, however, the odor impression is more sustainable, i.e., it does not disappear as quickly. In one embodiment, the fragrance therefore has a melting point which is in the range from −100° C. to 100° C., preferably from −80° C. to 80° C., more preferably from −20° C. to 50° C., in particular from −30° C. to 20° C. In a further embodiment, the fragrance has a boiling point in the range from 25° C. to 400° C., preferably from 50° C. to 380° C., more preferably from 75° C. to 350° C., in particular from 100° C. to 330° C.

Overall, a chemical substance should not exceed a particular molecular mass in order to act as a fragrance, since the required volatility can no longer be ensured at too high a molecular mass. In one embodiment, the fragrance has a molecular mass of 40 to 700 g/mol, more preferably of 60 to 400 g/mol.

Individual fragrance compounds, for example the synthetic products of the ester, ether, aldehyde, ketone, alcohol and hydrocarbon types, can be used as fragrances.

Fragrance compounds of the aldehyde type include, for example, adoxal (2,6,10-trimethyl-9-undecenal), anisaldehyde (4-methoxybenzaldehyde), cymal (3-(4-isopropylphenyl)-2-methylpropanal), ethyl vanillin, florhydral (3-(3-isopropylphenyl)butanal), helional (3-(3,4-methylenedioxyphenyl)-2-methylpropanal), heliotropin, hydroxycitronellal, lauraldehyde, lyral (3- and 4-(4-hydroxy-4-methylpentyl)-3-cyclohexene-1-carboxaldehyde), methyl nonyl acetaldehyde, filial (3-(4-tert-butylphenyl)-2-methylpropanal), phenyl acetaldehyde, undecylenic aldehyde, vanillin, 2,6,10-trimethyl-9-undecenal, 3-dodecen-1-al, alpha-n-amyl cinnamic aldehyde, melonal (2,6-dimethyl-5-heptenal), 2,4-dimethyl-3-cyclohexene-1-carboxaldehyde (triplal), 4-methoxybenzaldehyde, benzaldehyde, 3-(4-tert-butylphenyl)propanal, 2-methyl-3-(paramethoxyphenyl) propanal, 2-methyl-4-(2,6,6-timethyl-2(1)-cyclohexene-1-yl)butanal, 3-phenyl-2-propenal, cis-/trans-3,7-dimethyl-2,6-octadien-1-al, 3,7-dimethyl-6-octen-1-al, [(3,7-dimethyl-6-octenyl)oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexen-1-carboxaldehyde, 2-methyl-3-(isopropylphenyl)propanal, 1-decanal, 2,6-dimethyl-5-heptenal, 4-(tricyclo[5.2.1.0(2,6)]-decylidene-8)-butanal, octahydro-4,7-methano-1H-indene carboxaldehyde, 3-ethoxy-4-hydroxybenzaldehyde, para-ethyl-alpha,alpha-dimethyl hydrocinnamic aldehyde, alpha-methyl-3,4-(methylenedioxy)-hydrocinnamic aldehyde, 3,4-methylenedioxybenzaldehyde, alpha-n-hexyl cinnamic aldehyde, m-cymene-7-carboxaldehyde, alpha-methyl phenyl acetaldehyde, 7-hydroxy-3,7-dimethyloctanal, undecenal, 2,4,6-trimethyl-3-cyclohexene-1-carboxaldehyde, 4-(3)(4-methyl-3-pentenyl)-3-cyclohexene carboxaldehyde, 1-dodecanal, 2,4-dimethylcyclohexene-3-carboxaldehyde, 4-(4-hydroxy-4-methylpentyl)-3-cylohexene-1-carboxaldehyde, 7-methoxy-3,7-dimethyloctan-1-al, 2-methylundecanal, 2-methyldecanal, 1-nonanal, 1-octanal, 2,6,10-trimethyl-5,9-undecadienal, 2-methyl-3-(4-tert-butyl)propanal, dihydrocinnamic aldehyde, 1-methyl-4-(4-methyl-3-pentenyl)-3-cyclohexene-1-carboxaldehyde, 5- or 6-methoxyhexahydro-4,7-methanindan-1- or -2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexene carboxaldehyde, 7-hydroxy-3,7-dimethyloctanal, trans-4-decenal, 2,6-nonadienal, para-tolyl acetaldehyde, 4-methylphenylacetaldehyde, 2-methyl-4-(2,6,6-trimethyl-1-cyclohexen-1-yl)-2-butenal, ortho-methoxy cinnamic aldehyde, 3,5,6-trimethyl-3-cyclohexene carboxaldehyde, 3,7-dimethyl-2-methylene-6-octenal, phenoxyacetaldehyde, 5,9-dimethyl-4,8-decadienal, peony aldehyde (6,10-dimethyl-3-oxa-5,9-undecadien-1-al), hexahydro-4,7-methanindan-1-carboxaldehyde, 2-methyloctanal, alpha-methyl-4-(1-methylethyl)benzene acetaldehyde, 6,6-dimethyl-2-norpinen-2-propionaldehyde, para-methyl phenoxy acetaldehyde, 2-methyl-3-phenyl-2-propen-1-al, 3,5,5-trimethylhexanal, hexahydro-8,8-dimethyl-2-naphthaldehyde, 3-propylbicyclo[2.2.1]-hept-5-ene-2-carbaldehyde, 9-decenal, 3-methyl-5-phenyl-1-pentanal, methyl nonyl acetaldehyde, hexanal and trans-2-hexenal.

Suitable aromatic ketones include, but are not limited to, methyl beta-naphthyl ketone, musk indanone (1,2,3,5,6,7-hexahydro-1,1,2,3,3-pentamethyl-4H-inden-4-one), tonalid (6-acetyl-1,1,2,4,4,7-hexamethyltetraline), alpha-damascone, beta-damascone, delta-damascone, iso-damascone, damascenone, methyl dihydrojasmonate, menthone, carvone, camphor, koavone (3,4,5,6,6-pentamethylhept-3-en-2-one), fenchone, alpha-ionone, beta-ionone, gamma-methyl ionone, fleuramone (2-heptylcyclopentanone), dihydrojasmone, cis-jasmone, Iso E Super (1-(1,2,3,4,5,6,7,8-octahydro-2,3,8,8-tetramethyl-2-naphthalenyl)-ethan-1-one (and isomers thereof), methyl cedrenyl ketone, acetophenone, methyl acetophenone, para-methoxy acetophenone, methyl beta-naphthyl ketone, benzylacetone, benzophenone, para-hydroxyphenyl butanone, celery ketone (3-methyl-5-propyl-2-cyclohexenone), 6-isopropyldecahydro-2-naphtone, dimethyl octenone, frescomenthe (2-butan-2-ylcyclohexan-1-one), 4-(1-ethoxyvinyl)-3,3,5,5-tetramethylcyclohexanone, methyl heptenone, 2-(2-(4-methyl-3-cyclohexen-1-yl)propyl)cyclopentanone, 1-(p-menthen-6(2)yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4(5H)-indanone, 4-damascol, dulcinyl (4-(1,3-benzodioxol-5-yl)butan-2-one), hexalone (1-(2,6,6-trimethyl-2-cyclohexen-1-yl)-1,6-heptadien-3-one), isocyclemone E (2-acetonaphthone-1,2,3,4,5,6,7,8-octahydro-2,3,8,8-tetramethyl), methyl nonyl ketone, methyl cyclocitrone, methyl lavender ketone, orivone (4-tert-amylcyclohexanone), 4-tert-butylcyclohexanone, delphone (2-pentylcyclopentanone), muscone (CAS 541-91-3), neobutenone (1-(5,5-dimethyl-1-cyclohexenyl)pent-4-en-1-one), plicatone (CAS 41724-19-0), veloutone (2,2,5-trimethyl-5-pentylcyclopentan-1-one), 2,4,4,7-tetramethyloct-6-en-3-one and tetrameran (6,10-dimethylundecen-2-one).

Fragrance compounds of the alcohol type include, for example, 10-undecen-1-ol, 2,6-dimethylheptane-2-ol, 2-methylbutanol, 2-methylpentanol, 2-phenoxyethanol, 2-phenylpropanol, 2-tert-butylcyclohexanol, 3,5,5-trimethylcyclohexanol, 3-hexanol, 3-methyl-5-phenylpentanol, 3-octanol, 3-phenylpropanol, 4-heptenol, 4-isopropylcyclohexanol, 4-tert-butylcyclohexanol, 6,8-dimethyl-2-nonanol, 6-nonen-1-ol, 9-decen-1-ol, α-methylbenzyl alcohol, α-terpineol, amyl salicylate, benzyl alcohol, benzyl salicylate, β-terpineol, butyl salicylate, citronellol, cyclohexyl salicylate, decanol, dihydromyrcenol, dimethylbenzylcarbinol, dimethylheptanol, dimethyloctanol, ethyl salicylate, ethylvanillin, eugenol, geraniol, heptanol, hexyl salicylate, isoborneol, isoeugenol, isopulegol, linalool, menthol, myrtenol, n-hexanol, nerol, nonanol, octanol, para-menthan-7-ol, phenylethyl alcohol, phenol, phenyl salicylate, tetrahydrogeraniol, tetrahydrolinalool, thymol, trans-2-cis-6-nonadienol, trans-2-nonen-1-ol, trans-2-octenol, undecanol, vanillin, champiniol, hexenol and cinnamyl alcohol.

Fragrance compounds of the ester type are, for example, benzyl acetate, phenoxyethyl isobutyrate, p-tert butylcyclohexyl acetate, linalyl acetate, dimethylbenzyl carbinyl acetate (DMBCA), phenylethyl acetate, benzyl acetate, ethylmethylphenyl glycinate, allyl cyclohexyl propionate, styrallyl propionate, benzyl salicylate, cyclohexyl salicylate, floramate, melusate, and jasmacyclate.

The ethers include, for example, benzyl ethyl ether and Ambroxan. Hydrocarbons mainly include terpenes, such as limonene and pinene.

Preferably, mixtures of different fragrances are used, which together produce an attractive fragrance note. Such a mixture of fragrances can also be referred to as perfume or perfume oil. Perfume oils of this kind can also contain natural fragrance mixtures, as are obtainable from plant sources.

Fragrances of plant origin include essential oils, such as angelica root oil, anise oil, arnica blossom oil, basil oil, bay oil, champaca blossom oil, citrus oil, noble fir oil, noble fir cone oil, elemi oil, eucalyptus oil, fennel oil, spruce needle oil, galbanum oil, geranium oil, ginger grass oil, guaiac wood oil, gurjun balsam oil, helichrysum oil, ho oil, ginger oil, iris oil, jasmine oil, cajeput oil, calamus oil, chamomile oil, camphor oil, cananga oil, cardamom oil, cassia oil, pine needle oil, copaiba balsam oil, coriander oil, spearmint oil, caraway seed oil, cumin oil, labdanum oil, lavender oil, lemongrass oil, lime blossom oil, lime oil, mandarin oil, melissa oil, mint oil, musk seed oil, muscatel oil, myrrh oil, clove oil, neroli oil, niaouli oil, olibanum oil, origanum oil, orange blossom oil, orange peel oil, origanum oil, palmarosa oil, patchouli oil, perubalsam oil, petitgrain oil, pepper oil, peppermint oil, allspice oil, pine oil, rose oil, rosemary oil, sage oil, sandalwood oil, celery oil, spike oil, star anise oil, turpentine oil, thuja oil, thyme oil, verbena oil, vetiver oil, juniper berry oil, wormwood oil, wintergreen oil, ylang-ylang oil, hyssop oil, cinnamon oil, cinnamon leaf oil, citronella oil, lemon oil as well as cypress oil as well as ambrettolide, ambroxan, α-amyl cinnamaldehyde, anethol, anisaldehyde, anisic alcohol, anisole, anthranilic acid methyl ester, acetophenone, benzylacetone, benzaldehyde, benzoic acid ethyl ester, benzophenone, benzyl alcohol, benzyl acetate, benzyl benzoate, benzyl formate, benzyl valerate, borneol, bornyl acetate, boisambrene forte, α-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptincarboxylic acid methyl ester, heptaldehyde, hydroquinone dimethyl ether, hydroxycinnamaldehyde, hydroxycinnamic alcohol, indole, iran, isoeugenol, isoeugenol methyl ether, isosafrol, jasmone, camphor, carvacrol, carvone, p-cresol methyl ether, coumarin, p-methoxyacetophenone, methyl n-amyl ketone, methyl anthranilic acid methyl ester, p-methyl acetophenone, methyl chavicol, p-methyl quinoline, methyl-β-naphthyl ketone, methyl-n-nonyl acetaldehyde, methyl-n-nonyl ketone, muscone, β-naphthol ethyl ether, β-naphthol methyl ether, nerol, n-nonyl aldehyde, nonyl alcohol, n-octyl aldehyde, p-oxy acetophenone, pentadecanolide, β-phenylethyl alcohol, phenylacetic acid, pulegone, safrole, salicylic acid isoamyl ester, salicylic acid methyl ester, salicylic acid hexyl ester, salicylic acid cyclohexyl ester, santalol, sandelice, skatole, terpineol, thymene, thymol, troenan, γ-undelactone, vanillin, veratrum aldehyde, cinnamaldehyde, cinnamic alcohol, cinnamic acid, cinnamic acid ethyl ester, cinnamic acid benzyl ester, diphenyl oxide, limonene, linalool, linalyl acetate and propionate, melusate, menthol, menthone, methyl-n-heptenone, pinene, phenylacetaldehyde, terpinyl acetate, citral, citronellal, and mixtures thereof.

Fragrances in a free form or in an encapsulated form can be a component of the solid washing agent or cleaning agent. The fragrance capsules used are particularly preferably core-shell particles. Corresponding particles known to a person skilled in the art have a fragrance-containing core and a cladding material surrounding said core. In general, high molecular weight compounds of animal or plant origin, e.g., protein compounds (gelatin, albumin, casein), cellulose derivatives (methylcellulose, ethylcellulose, cellulose acetate, cellulose nitrate, carboxymethyl cellulose), and in particular synthetic polymers (e.g., polyamides, polyolefins, polyesters, polyurethanes, epoxy resins, silicone resins and condensation products of carbonyl and NH group-containing compounds), can be used as cladding material. Specifically, the cladding material can be selected from polyacrylates; polyethylenes; polyamides; polystyrenes; polyisoprenes; polycarbonates; polyesters; polyureas; polyurethanes; polyolefins; polysaccharides; epoxy resins; vinyl polymers; urea cross-linked with formaldehyde or glutaraldehyde; melamine cross-linked with formaldehyde; gelatin-polyphosphate coacervates, optionally cross-linked with glutaraldehyde; gelatin-gum arabic coacervates, silicone resins; polyamines reacted with polyisocyanates; acrylate monomers polymerized by means of free radical polymerization; silk, wool; gelatin; cellulose; proteins; and mixtures and copolymers of the foregoing. Particular preference is given to polyacrylates, polylactic acids, polyethylenes, polyamides, polystyrenes, polyisoprenes, polycarbonates, polyesters, polyureas, polyurethanes, polyolefins, epoxy resins, vinyl polymers and urea and/or melamine cross-linked with formaldehyde or glutaraldehyde.

In a corresponding embodiment, at least a portion of the fragrance is used in encapsulated form (fragrance capsules), in particular in microcapsules. However, the entire fragrance can also be used in encapsulated form. The microcapsules may be water-soluble and/or water-insoluble microcapsules. For example, melamine-urea-formaldehyde microcapsules, melamine-formaldehyde microcapsules, urea-formaldehyde microcapsules or starch microcapsules can be used. “Fragrance precursor” refers to compounds which release the actual fragrance only after chemical conversion/cleavage, typically by the action of light or other ambient conditions, such as pH, temperature, etc. Such compounds are often also referred to as “pro-fragrances”.

The gas permeability of the water-soluble nonwovens characterizing the washing agent portion units according to the invention increases the diversity of the fragrance impressions that can be realized with the aid of the washing agent portion units. In this case, not only the immediate fragrance impression of the washing agent portion unit can be modified in an unexpected manner. Furthermore, the fragrance impression of the substrate treated with the solid washing agent or cleaning agent, for example a textile fabric, can be achieved with a fragrance quantity that is reduced compared to conventional water-soluble washing agent portion units.

Preferred solid washing agent or cleaning agents comprise both free and encapsulated fragrances. While the free fragrances are immediately perceptible to the user due to the permeability of the water-soluble nonwoven fabric, the encapsulated fragrances form the basis of the fragrance impression realized after use on the treated substrate. It has proven to be particularly advantageous if the weight ratio of the free fragrance to the fragrance present in an encapsulated form is between 2:1 and 1:8, preferably between 1:1 and 1:6. "Weight" is understood in each case to mean the actual weight of the fragrance compound without taking into account any auxiliary substances or capsule materials.

Textile-care compounds form a further group of preferred ingredients of the solid washing agent or cleaning agent. Preferred washing agent portion units contain, relative to their total weight, 0.2 to 30 wt. %, preferably 0.5 to 20 wt. %, and in particular 1 to 15 wt. % textile-care compound.

The group of textile-care compounds preferably comprises in particular:

cationic surfactants;

amphoteric surfactants;

cationic polymers;

fatty substances;

silicones, preferably aminosilicones;

phyllosilicates, preferably bentonite.

It is particularly preferred if the textile-care compound is selected from polysiloxanes, textile-softening clays, cationic polymers, and mixtures thereof.

The use of polysiloxanes and/or cationic polymers as a textile-care compound in the composition is advantageous, because they not only exhibit a softening effect, but also enhance the perfume impression on the laundry.

The use of plasticizing clays as a textile-care compound in the composition is advantageous, because these additionally have a water-softening effect, and, for example, limescale deposits on the laundry can thus be prevented. In order to achieve optimum performance, it may be preferred that the composition comprise a combination of at least two textile-care compounds.

Preferred washing agent portion units contain a solid washing agent or cleaning agent that contains a textile-care compound from the group of cationic surfactants—in particular, a cationic surfactant from the group of esterquats. The term "esterquat," as used herein, refers to esters of quaternary ammonium polyols—in particular, quaternary ammonium diols and/or triols, such as, for example, triethanol methylammonium or diethanol dimethylammonium—with fatty acids.

The esterquats used in accordance with the invention are ideally liquid to pasty at temperatures around 20° C.

In various embodiments, the composition contains at least one esterquat of the formula $N^{+}(R_1)_4$-n($(CH_2)_m$-O—C(O)—$R_2)_n$X—, wherein each $R_1$ is independently a substituted or unsubstituted, linear or branched alkyl or alkenyl, and preferably an unsubstituted or hydroxy-substituted alkyl having 1 to 10 carbon atoms; each $R_2$ is a linear or branched, substituted or unsubstituted alkyl or alkenyl or a substituted or unsubstituted (hetero)aryl having up to 26 carbon atoms, and preferably linear unsubstituted $C_{10-26}$ alkyl; n is 1, 2, 3, or 4, and preferably 1, 2, or 3; m is an integer from 1 to 20, and preferably 1 to 4; and X— is any anion.

In various embodiments, in the compounds of formula $N^{+}(R_1)_4$—n($(CH_2)_m$—O—C(O)—$R_2)_n$X—, where n is 2 or 3, and preferably 2; and/or m is 1, 2, 3, or 4, and preferably 2, and/or each $R_1$ is independently selected from the group consisting of methyl, ethyl, n-propyl, isopropyl, n-butyl, isobutyl, hydroxymethyl, 2-hydroxyethyl, 2-hydroxypropyl and 3-hydroxypropyl, a first $R_1$ is preferably selected from methyl, ethyl, n-propyl, isopropyl, n-butyl, and isobutyl, and a second $R_1$ is preferably selected from methyl, ethyl, n-propyl, isopropyl, n-butyl, isobutyl, hydroxymethyl, 2-hydroxyethyl, 2-hydroxypropyl, and 3-hydroxypropyl; and/or each $R_2$ is independently selected from linear, unsubstituted $C_{12-20}$ alkyl, and preferably $C_{12-18}$ alkyl; and/or X— is selected from inorganic or organic anions, and in particular fluoride, chloride, bromide, and methosulfate.

In a particularly preferred embodiment, the esterquat used is an esterquat of the formula $N^{+}(R_1)_4$—n($(CH_2)_m$—O—C(O)—$R_2)_n$X—, where n=2 and m=2, the first $R_1$ is selected from methyl and ethyl, and preferably methyl, the second $R_1$ is selected from methyl and 2-hydroxyethyl, and preferably 2-hydroxyethyl, and each $R_2$ is linear, unsubstituted $C_{12-18}$ alkyl. Such esterquats are bis(acyloxyethyl)hydroxyethyl methyl ammonium compounds. The counterion is preferably methosulfate. Such esterquats are commercially available, for example, under the trade name, Dehyquart® AU-57 (BASF SE, DE).

Suitable textile-care compounds from the group of amphoteric surfactants include in particular alkylamidopropyl betaines, and preferably linear C8- or C10-alkylamidopropyl betaines, i.e., caprylamidopropyl betaine (N-(3-octanoyl)aminopropyl)-N-carboxymethyl-N,N-dimethyl-1-propanaminium) or capramidopropyl betaine (N-(3-decanoyl)aminopropyl)-N-carboxymethyl-N,N-dimethyl-1-propanaminium), or, very particularly preferably, mixtures of linear C8 and C10 alkylamidopropyl betaines. Such a betaine mixture is commercially available, for example, as Tegoten® B 810 from Evonik Industries.

Washing agent portion units can contain a textile-care compound from the group of the cationic polymers as a constituent of the solid washing agent or cleaning agent.

Suitable cationic polymers include in particular those described in "CTFA International Cosmetic Ingredient Dictionary," Fourth Edition, J. M. Nikitakis, et al., editors, published by the Cosmetic, Toiletry, and Fragrance Association, 1991, and are summarized under the collective name, "polyquaternium." Some suitable polyquaternium compounds are listed in more detail below: POLYQUATERNIUM-1 (CAS number: 68518-54-7), POLYQUATERNIUM-2 (CAS number: 63451-27-4), POLYQUATERNIUM-3, POLYQUATERNIUM-4 (CAS number: 92183-41-0), POLYQUATERNIUM-5 (CAS number: 26006-22-4), POLYQUATERNIUM-6 (CAS number: 26062-79-3), POLYQUATERNIUM-7 (CAS number: 26590 May 6), POLYQUATERNIUM-8, POLYQUATERNIUM-9, POLYQUATERNIUM-11 (CAS number: 53633-54-8), POLYQUATERNIUM-12 (CAS number: 68877-50-9), POLYQUATERNIUM-13 (CAS number: 68877-47-4), POLYQUATERNIUM-14 (CAS number: 27103-90-8), POLYQUATERNIUM-15 (CAS number: 35429-19-7), POLYQUATERNIUM-16 (CAS number: 95144-24-4), POLYQUATERNIUM-17 (CAS number: 90624-75-2), POLYQUATERNIUM-18, POLYQUATERNIUM-19, POLYQUATERNIUM-20, POLYQUATERNIUM-21 (CAS number: 102523-94-4), POLYQUATERNIUM-22 (CAS number: 53694-17-0), POLYQUATERNIUM-24 (CAS number: 107987-23-5), POLYQUATERNIUM-27, POLYQUATERNIUM-28 (CAS number: 131954-48-8), POLYQUATERNIUM-29, POLYQUATERNIUM-30, POLYQUATERNIUM-31 (CAS number: 136505-02-7), POLYQUATERNIUM-32 (CAS number: 35429-19-7), POLYQUATERNIUM-37 (CAS number: 26161-33-1), POLYQUATERNIUM-44 (CAS number: 150595-70-5), and POLYQUATERNIUM-68 (CAS number: 827346-45-2).

Alternatively, preferred washing agent portion units as a constituent of the solid washing agent or cleaning agent contain a textile-care compound from the group of silicones, and preferably aminosilicones.

A preferably usable polysiloxane has the structural unit a) —$(R_1)_2$Si—O$)_n$—, where $R_1$=C1-C30-alkyl independent of one another, and preferably C1-C4-alkyl, and in particular methyl or ethyl, and n=1 to 5,000, preferably 10 to 2,500, and in particular 100 to 1,500.

If the polysiloxane has only the structural unit a), where $R_1$=methyl, it is a polydimethyl siloxane. Polydimethyl polysiloxanes are known as efficient textile-care compounds. Suitable polydimethyl siloxanes include DC-200 (ex Dow Corning), Baysilone® M 50, Baysilone® M 100, Baysilone® M 350, Baysilone® M 500, Baysilone® M 1000, Baysilone® M 1500, Baysilone® M 2000, or Baysilone® M 5000 (all ex GE Bayer Silicones).

Preferably, the polysiloxane additionally also has the structural unit b) —$(R_1)(YNR_2R_3)$Si—O$)_x$—, where $R_1$=C1-C30-alkyl, preferably C1-C4-alkyl, and in particular methyl or ethyl, Y=optionally substituted, linear or branched C1-C20-alkylene, and preferably —$(CH_2)$m—, where m=1 to 16, preferably 1 to 8, in particular 2 to 4, and especially 3, $R_2$, $R_3$=independently of one another H or optionally substituted, linear or branched C1-C30-alkyl, and preferably C1-C30-alkyl substituted with amino groups, particularly preferably —$(CH_2)_b$—$NH_2$, where b=1 to 10, most preferably b=2, and x=1 to 5,000, preferably 10 to 2,500, and in particular 100 to 1,500.

A particularly preferred polysiloxane has the following structure: $(CH_3)_3$SH—[O—Si$(CH_3)_2$]n—[O—Si$(CH_3)${$(CH_2)_3$—NH—$(CH_2)_2$—$NH_2$}]x-OSi$(CH_3)_3$, where the sum n+x is a number between 2 and 10,000.

In various preferred embodiments of the invention, the compositions may contain at least one aminosiloxane as silicone oil. This can be selected, for example, from the group comprising amodimethicone/morpholinomethyl silsesquioxane copolymer (CAS no. 1293390-78-9), trideceth-9 PG amodimethicone (CAS no. 943769-53-7), with methylsilsesquioxane hydroxy-terminated dimethyl, methyl(aminoethylaminoisobutyl)siloxane (CAS no. 863918-80-3), and dimethyl, methyl(aminoethylaminoisobutyl)siloxanes (CAS no. 106842-44-8). Particularly preferred is amodimethicone/morpholinomethyl silsesquioxane copolymer (CAS no. 1293390-78-9), which is commercially available as Belsil® ADM 8301 E (Wacker Chemie).

Aminosiloxanes are additionally used to improve the water absorption capacity, the rewettability of the treated textiles, and to facilitate ironing the treated textiles. They additionally improve the rinsing out behavior of the agent according to the invention by virtue of their foam-inhibiting properties. If an agent is mentioned in the present application, this is understood to mean the softener.

Further preferred washing agent portion units are characterized in that the solid washing agent or cleaning agent comprises a textile-care compound from the group of the phyllosilicates, and preferably bentonites.

A suitable textile-softening phyllosilicate is, for example, a smectite clay. Preferred smectite clays include beidellite clays, hectorite clays, laponite clays, montmorillonite clays, nontronite clays, saponite clays, sauconite clays, and mixtures thereof. Montmorillonite clays are the preferred softening clays. Bentonites contain mainly montmorillonite and can be used as a preferred source for the textile-softening clay. The bentonites can be used as powders or crystals.

Suitable bentonites are sold, for example, under the names, Landrosil®, from Süd-Chemie or under the name, Detercal, from Laviosa. It is preferred that the textile-care composition contain a powdered bentonite as a textile-care compound.

In an embodiment that is preferred due to its ready accessibility, the washing agent portion unit has only one receiving chamber. Of course, it is also possible to provide washing agent portion units having two, three, or four receiving chambers. If the washing agent portion unit has more than one receiving chamber, these receiving chambers are preferably filled with solid washing agents or cleaning agents that are different from one another.

Due to its reduced adhesion and bonding tendency, it is possible to package a washing agent portion unit together with further portion units in larger containers, without further outer packaging. It is preferred that the washing agent portion unit be packaged in an outer packaging together with at least one further washing agent portion unit, and preferably with at least ten further washing agent portion units—preferably loose in bulk—in direct contact with one another.

A further subject matter of the application is a method for producing a washing agent portion unit described above, comprising the steps of:

i) providing a water-soluble two-dimensional structure;

ii) deforming the water-soluble two-dimensional structure to form a receiving chamber;

iii) filling the receiving chamber with a solid washing agent or cleaning agent;

iv) closing the filled receiving chamber.

In step (i) of the production process, water-soluble polymer films or alternatively water-soluble nonwovens can be used as water-soluble two-dimensional structures.

Before filling with the solid washing agent or cleaning agent, the water-soluble two-dimensional structure is deformed in step (ii) of the method, forming a receiving chamber. This deformation is preferably carried out by deep-drawing the two-dimensional structure—for example, under the action of negative pressure. In particular when a nonwoven is used in step (i), it has proven advantageous to effect the deformation in step (ii) by the action of a punch.

After being filled in step (iii), the filled receiving chamber is closed in step (iv). Water-soluble nonwovens in particular have proven effective as closure means. If a water-soluble nonwoven is used in step (i), a washing agent portion unit according to the invention can be obtained if the filled receiving chamber in step (iv) is closed even without the use of a further water-soluble two-dimensional structure.

It is preferable for the filled receiving chamber to be sewn in step (iv), wherein sewing by means of a water-soluble material, preferably by means of a water-soluble thread, particularly preferably by means of a water-soluble thread made of polyvinyl alcohol, has proven to be particularly advantageous.

A third claimed subject is a method for textile care or textile cleaning in which one of the aforementioned washing agent portion units is introduced into the dispensing drawer or the washing drum of a textile washing machine.

The machine textile washing method is preferably carried out at temperatures of 20° C. to 90° C., and preferably 30° C. to 45° C.

Preferred embodiments of the production method and the method for textile care or textile cleaning have, mutatis mutandis, the features cited with respect to the washing agent portion unit, to which reference is made at this point in order to avoid repetitions.

In summary, this application provides, inter alia, the following subject matter:

1. A washing agent portion unit comprising
   a) a solid washing agent or cleaning agent and
   b) a water-soluble wrapping that completely encloses the solid washing agent or cleaning agent, wherein the water-soluble wrapping consists at least in part of a water-soluble nonwoven.
2. The washing agent portion unit according to point 1, wherein the portion unit is in the form of a bag.
3. The washing agent portion unit according to one of the preceding points, wherein the portion unit is in the form of a sachet.
4. The washing agent portion unit according to point 3, wherein the sachet comprises two water-soluble two-dimensional structures that are connected to a bag by means of a circumferential sealing seam, the interior of which bag contains the solid washing agent or cleaning agent.
5. The washing agent portion unit according to item 4, wherein at least one of the two water-soluble two-dimensional structures of the sachet comprises a water-soluble nonwoven.
6. The washing agent portion unit according to point 4, wherein the circumferential sealing seam has a rounded profile.
7. The washing agent portion unit according to one of the preceding points, wherein the portion unit has a cubical, cylindrical, or spherical-dome-shaped receiving chamber.
8. The washing agent portion unit according to one of the preceding points, wherein the washing agent portion unit has a volume of 4 to 70 mL, preferably 6 to 50 mL, and in particular 8 to 25 mL.
9. The washing agent portion unit according to one of the preceding points, wherein the water-soluble nonwoven forms part of the outer surface of the washing agent portion unit and is in direct contact with the solid washing agent or cleaning agent.
10. The washing agent portion unit according to one of the preceding points, wherein the solid washing agent or cleaning agent is present in the form of a powder, granulate, extrudate, compaction, or cast body, and preferably in the form of a granulate, extrudate, or compaction.
11. The washing agent portion unit according to one of the preceding points, wherein the water-soluble wrapping consists of a water-soluble polymer to an extent of at least 50 wt. %, preferably to an extent of at least 60 wt. %, particularly preferably to an extent of 60% to 95 wt. %, and in particular to an extent of 65% to 95 wt. %.
12. The washing agent portion unit according to one of the preceding points, wherein the water-soluble wrapping comprises a water-soluble polymer from the group of polyvinyl alcohols and copolymers thereof, and preferably from the group of polyvinyl alcohols.
13. The washing agent portion unit according to one of the preceding points, wherein the water-soluble wrapping consists entirely of a water-soluble nonwoven.
14. The washing agent portion unit according to one of the preceding points, wherein the water-soluble wrapping comprises a water-soluble polymer film and a water-soluble nonwoven.
15. The washing agent portion unit according to one of the preceding points, wherein the water-soluble wrapping comprises a water-soluble polymer film and a water-soluble nonwoven and the edge regions of the water-soluble polymer film and of the water-soluble nonwoven are connected to one another such that both jointly enclose a volume that is filled at least in part with the solid washing agent or cleaning agent.
16. The washing agent portion unit according to one of the preceding points, wherein the volume enclosed by the water-soluble wrapping corresponds to more than twice the volume, preferably more than four times the volume and in particular more than eight times the volume of the water-soluble wrapping material.
17. The washing agent portion unit according to one of the preceding points, wherein the proportion by weight of the water-soluble wrapping with respect to the total weight of the washing agent portion unit is less than 20 wt. %, preferably less than 10 wt. %, and in particular less than 8%, particularly preferably between 2 and 10 wt. % and very particularly preferably between 2 and 8 wt. %.
18. The washing agent portion unit according to one of the preceding points, wherein the water-soluble wrapping comprises a water-soluble polymer film and a water-soluble nonwoven, and the water-soluble polymer film and the water-soluble nonwoven are connected to one another by heat sealing, water sealing, ultrasound welding.
19. The washing agent portion unit according to one of the preceding points, wherein the water-soluble wrapping comprises a water-soluble polymer film and a water-soluble nonwoven, and the water-soluble polymer film and a water-soluble nonwoven are sewn together.
20. The washing agent portion unit according to point 19, wherein the water-soluble polymer film and the water-soluble nonwoven are sewn together by means of a water-soluble material, preferably by means of a water-soluble thread, particularly preferably by means of a water-soluble thread made of polyvinyl alcohol.
21. The washing agent portion unit according to one of the preceding points, wherein the water-soluble wrapping comprises a deep-drawn water-soluble polymer film and a water-soluble nonwoven.
22. The washing agent portion unit according to one of the preceding points, wherein the water-soluble nonwoven forms at least 10%, preferably 15 to 80%, particularly preferably 25 to 60%, and in particular 30 to 45% of the surface of the washing agent portion unit.
23. The washing agent portion unit according to one of the preceding points, wherein the water-soluble nonwoven consists of polyvinyl alcohol or polyvinyl alcohol copolymers, and in particular polyvinyl alcohols, to an extent of at least 50 wt. %, preferably to an extent of at least 70 wt. %, particularly preferably to an extent of at least 90 wt. %, and in particular to an extent of at least 98 wt. %.
24. The washing agent portion unit according to one of the preceding points, wherein the water-soluble nonwoven contains more than 2 wt. %, preferably more than 4 wt. %, particularly preferably more than 8 wt. %, in particular 8 to 60 wt. %, preferably 12 to 50 wt. %, and in particular 24 to 40 wt. % washing or cleaning ingredient.

25. The washing agent portion unit according one of the preceding points, wherein the water-soluble nonwoven is selected from the group of the needle-punched nonwovens.
26. The washing agent portion unit according to one of the preceding points, wherein the water-soluble nonwoven is selected from the group of random orientation nonwovens.
27. The washing agent portion unit according to one of the preceding points, wherein the water-soluble nonwoven fabric has a weight per unit area of 40 to 200 g/$m^2$, preferably of 60 to 180 g/$m^2$, and in particular of 80 to 160 g/$m^2$.
28. The washing agent portion unit according to points 1 to 19, wherein the water-soluble nonwoven is selected from the group of integral nonwovens.
29. The washing agent portion unit according to one of points 1 to 24 and 27, wherein the water-soluble nonwoven is selected from the group of cross-layered nonwovens.
30. The washing agent portion unit according to one of points 1 to 24, 27 and 28, wherein the water-soluble nonwoven has a weight per unit area of 30 to 80 g/$m^2$, preferably of 33 to 70 g/$m^2$, and in particular of 36 to 70 g/$m^2$.
31. The washing agent portion unit according to one of the preceding points, wherein the water-soluble nonwoven is white.
32. The washing agent portion unit according to one of the preceding points, wherein the water-soluble nonwoven is printed on its outer side.
33. The washing agent portion unit according to one of the preceding points, wherein the wrapping of the portion unit comprises a water-soluble film, and this film is transparent.
34. The washing agent portion unit according to one of the preceding points, wherein the wrapping of the portion unit comprises a water-soluble film, and this film is printed.
35. The washing agent portion unit according to one of the preceding points, wherein the solid washing agent or cleaning agent is at least in part colored.
36. The washing agent portion unit according to one of the preceding points, wherein the water-soluble nonwoven comprises at least one washing or cleaning ingredient, preferably at least one washing or cleaning ingredient from the group of fragrances.
37. The washing agent portion unit according to one of the preceding points, wherein the solid washing agent or cleaning agent comprises at least one washing or cleaning ingredient from the group of builders, surfactants, washing polymers, enzymes, bleaching agents, and fragrances.
38. The washing agent portion unit according to one of the preceding points, wherein the solid washing agent or cleaning agent comprises at least one washing or cleaning ingredient from the group of bleaching agents, and preferably oxygen bleaching agents.
39. The washing agent portion unit according to point 38, wherein the oxygen bleaching agent is selected from the group of sodium percarbonate and ε-phthalimidoperoxycaproic acid, preferably from the group of sodium percarbonate.
40. The washing agent portion unit according to point 38 or 39, wherein the proportion by weight of oxygen bleach with respect to the total weight of the solid washing agent or cleaning agent is 2 to 60 wt. %, preferably 4 to 40 wt. %.
41. The washing agent portion unit according to one of the preceding points, wherein the solid washing agent or cleaning agent comprises at least one washing or cleaning ingredient from the group of fragrances.
42. The washing agent portion unit according to point 41, wherein the fragrance is selected from the group of free fragrances and fragrance capsules.
43. The washing agent portion unit according to point 41 or 42, wherein the proportion by weight of fragrance with respect to the total weight of the solid washing agent or cleaning agent is 0.1 to 10 wt. %, preferably 0.2 to 6 wt. %.
44. The washing agent portion unit according to one of the preceding points, wherein the solid washing agent or cleaning agent comprises free fragrance and encapsulated fragrance and the weight ratio of the free fragrance to the fragrance present in an encapsulated form is between 2:1 and 1:8, preferably between 1:1 and 1:6.
45. The washing agent portion unit according to one of the preceding points, wherein the solid washing agent or cleaning agent comprises, relative to its total weight, 0.2 to 30 wt. %, preferably 0.5 to 20 wt. %, and in particular 1 to 15 wt. % textile-care compound.
46. The washing agent portion unit according to one of the preceding points, wherein the solid washing agent or cleaning agent comprises a textile-care compound from the group of cationic surfactants.
47. The washing agent portion unit according to one of the preceding points, wherein the solid washing agent or cleaning agent comprises a textile-care compound from the group of amphoteric surfactants.
48. The washing agent portion unit according to one of the preceding points, wherein the solid washing agent or cleaning agent comprises a textile-care compound from the group of cationic polymers.
49. The washing agent portion unit according to one of the preceding points, wherein the solid washing agent or cleaning agent comprises a textile-care compound from the group of fatty substances.
50. The washing agent portion unit according to one of the preceding points, wherein the solid washing agent or cleaning agent comprises a textile-care compound from the group of the phyllosilicates, and preferably bentonites.
51. The washing agent portion unit according to one of the preceding points, wherein the solid washing agent or cleaning agent comprises a textile-care compound from the group of silicones, and preferably aminosilicones.
52. The washing agent portion unit according to one of the preceding points, wherein the solid washing agent or cleaning agent contains less than 10 wt. %, and preferably less than 5 wt. % water.
53. The washing agent portion unit according to one of the preceding points, wherein the washing agent portion unit has a receiving chamber.
54. The washing agent portion unit according to one of the preceding points, wherein the washing agent portion unit has two, three, or four receiving chambers that are filled with solid washing agent or cleaning agents that are different from one another.
55. The washing agent portion unit according to one of the preceding points, wherein the washing agent portion unit is packaged in an outer packaging together with at least one further washing agent portion unit—preferably loose in bulk—in direct contact with one another.

56. A method for producing a washing agent portion unit according to one of points 1 to 55, comprising the steps of:
   i) providing a water-soluble two-dimensional structure;
   ii) deforming the water-soluble two-dimensional structure to form a receiving chamber;
   iii) filling the receiving chamber with a solid washing agent or cleaning agent;
   iv) closing the filled receiving chamber.
57. The method according to point 56, wherein a water-soluble polymer film is used as the water-soluble two-dimensional structure in step i).
58. The method according to point 56, wherein a water-soluble nonwoven is used as the water-soluble two-dimensional structure in step i).
59. The method according to one of the preceding points, wherein the water-soluble two-dimensional structure is deep-drawn in step ii).
60. The method according to one of the preceding points, wherein the water-soluble two-dimensional structure is deformed in step ii) by the action of a punch.
61. The method according to one of the preceding points, wherein the receiving chamber in step iv) is closed by means of a water-soluble nonwoven.
62. The method according to one of the preceding points, wherein the water-soluble nonwoven from step i) is closed in step iv) without using a further water-soluble two-dimensional structure to form a washing agent portion unit.
63. The method according to one of the preceding points, wherein the filled receiving chamber is closed in step iv) by sewing.
64. The method according to one of the preceding points, wherein the filled receiving chamber in step iv) is closed by sewing by means of a water-soluble material, preferably by means of a water-soluble thread, particularly preferably by means of a water-soluble thread made of polyvinyl alcohol.
65. A method for textile care or textile cleaning, in which a washing agent portion unit according to one of points 1 to 55 is introduced into the dispensing drawer or the washing drum of a textile washing machine.

The invention claimed is:

1. A washing agent portion unit comprising:

a solid washing agent or cleaning agent;

a water-soluble wrapping comprising a water-soluble polymer film and a water-soluble nonwoven; and a water-soluble thread sewn in at least part of edge regions of the water-soluble polymer film and the water-soluble nonwoven such that both completely enclose a volume that is filled at least in part with the solid washing agent or cleaning agent.

2. The washing agent portion unit of claim 1, wherein the water-soluble wrapping is in the form of a bag.

3. The washing agent portion unit of claim 1, wherein the water-soluble nonwoven is a needle-punched nonwoven.

4. The washing agent portion unit of claim 1, wherein the solid washing agent or cleaning agent comprises an oxygen bleaching agent selected from the group consisting of sodium percarbonate and ¿-phthalimidoperoxycaproic acid.

5. The washing agent portion unit of claim 1, wherein the solid washing agent or cleaning agent is fragrance free or comprises fragrance capsules.

6. The washing agent portion unit of claim 1, wherein the solid washing agent or cleaning agent comprises a fragrance present in an amount of from 0.1 to 10 wt. %, based on the total weight of the solid washing agent or cleaning agent.

7. The washing agent portion unit of claim 1, wherein the water-soluble wrapping is printed.

8. The washing agent portion unit of claim 7, wherein the water-soluble nonwoven is printed on its outer side.

9. The washing agent portion unit of claim 1, wherein the solid washing agent or cleaning agent comprises a textile-care compound present in an amount of from 0.2 to 30 wt. %, based on the total weight of the solid washing agent or cleaning agent.

10. A package containing a plurality of the washing agent portion units of claim 1 that are in direct contact with one another.

11. A method for textile care or textile cleaning, the method comprising introducing the washing agent portion unit of claim 1 into a dispensing drawer or a washing drum of a textile washing machine.

12. The washing agent portion unit of claim 1, wherein the water-soluble nonwoven overlays the water-soluble polymer film.

13. The washing agent portion unit of claim 1, wherein the sewn edge regions of the water-soluble polymer film and the water-soluble nonwoven have rounded profiles.

14. The washing agent portion unit of claim 1, wherein the water-soluble thread is made of polyvinyl alcohol.

15. The washing agent portion unit of claim 14, wherein the water-soluble polymer film comprises polyvinyl alcohol.

16. The washing agent portion unit of claim 1, wherein the water-soluble polymer film is present in an amount of from 65 to 95 wt. %, based on the total weight of the water-soluble wrapping.

17. The washing agent portion unit of claim 1, wherein the water-soluble wrapping defines a cubical, cylindrical, or spherical-dome-shaped receiving chamber for receiving the solid washing agent or cleaning agent.

18. The washing agent portion unit of claim 1, wherein the water-soluble wrapping is present in an amount of from 2 to 10 wt. %, based on the total weight of the washing agent portion unit.

19. The washing agent portion unit of claim 1, wherein the water-soluble nonwoven forms from 30% to 45% of the entire surface of the washing agent portion unit.

20. The washing agent portion unit of claim 15, wherein the water-soluble nonwoven comprises polyvinyl alcohol.

* * * * *